INVENTOR.
SAMUEL NOODLEMAN.

Patented Aug. 25, 1953

2,650,336

UNITED STATES PATENT OFFICE 2,650,336

ELECTRIC MOTOR AND MOTOR CONTROL MEANS

Samuel Noodleman, Dayton, Ohio, assignor to Louis R. Mahrt and D. Robert Laughter, as trustees for the Standard Dayton Corporation, Dayton, Ohio, a corporation of Ohio Application August 16, 1949, Serial No. 110,580

4 Claims. (Cl. 318—210)

This invention relates to electric motors and motor control means which make use of the ripple voltage for power purposes.

Various motor and motor control arrangements have been devised from time to time for intermittently driving a given piece of machinery which must be started and stopped at frequent intervals and in which the time required for stopping the motor and the machine driven thereby must be kept at a minimum for practical reasons. The need for increased dependability and precision in controls of this type has long been recognized and it is an object of this invention to better meet this need.

I have found that in all common types of motors there is generated a voltage, commonly called a ripple voltage, which results from the relative rotation between the motor rotor and the motor stator. The frequency of the ripple is a function of the speed, since it is generated in response to the rotor bars or conductors passing beneath the stator oil slots or pole pieces.

I have also found that in a double Y connected motor, for example, it is possible to so design the motor and so connect the control relay to the motor windings that the relay is influenced only by the ripple voltage and is not influenced by the main power, such as the 60 cycle voltage commonly used in energizing electric motors. In this connection I have also found that the available ripple voltage generated in a motor depends to a large extent upon the relationship between the number of current carrying bars or members and the number of stator teeth or slots. Thus, I have found that the ripple voltage available for operating a control relay or the like in a four-pole Y—Y connected motor having 33 rotor bars and 36 stator slots is very great when one connects the relay between the neutrals, whereas the ripple voltage available when connecting between the neutrals in a similar motor having 34 rotor bars and 36 stator slots is almost negligible.

It is an object of my invention to provide a motor in which the relationship between the rotor bars and the stator slots is such that the vector sum of the ripple voltages generated in the various phase windings, as the rotor bars pass beneath these windings, add up to produce a high resultant ripple voltage (obtainable by connecting across the neutrals of the two Y windings) which may be used for many different purposes, including speed indicating purposes and various motor control purposes such as regulating the speed of the motor or bringing the motor to a plug stop.

Another object of this invention is to provide a plug controller which utilizes the ripple voltage but which does not require the use of special blocking circuits or the like for segregating the ripple voltage from the main power supply voltage.

Since the frequency of the ripple voltage is known to be a direct function of the motor speed in a given motor design, it is another object of this invention to provide a device in which the ripple voltage can effectively be used as a speed indicator merely by applying the ripple voltage to a conventional voltmeter calibrated in terms of speed.

Other objects and advantages reside in the construction of parts, the combination thereof and the mode of operation, as will become more apparent from the following description.

Figure 1:
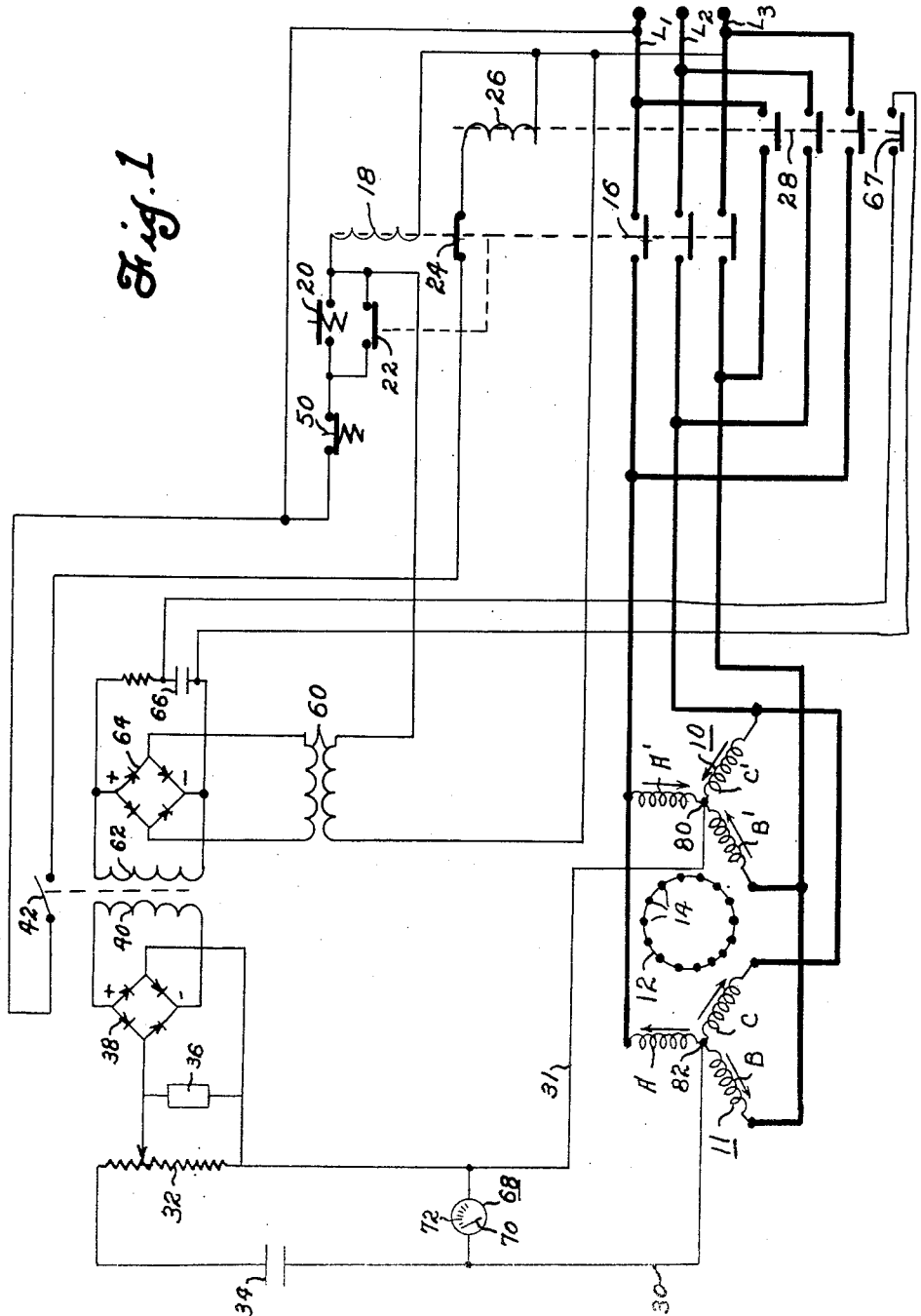
Figure 1 is a schematic circuit diagram illustrating a preferred embodiment of a motor provided with a plug controller which operates in response to ripple voltage.

Referring now to Figure 1 of the drawings wherein I have shown a preferred embodiment of my invention, reference numerals 10 and 11 designate the conventional field windings of a Y—Y connected, three phase, alternating current motor having a revolving armature 12 provided with conventional armature bars diagrammatically illustrated at 14 which pass through the magnetic flux created by the field windings 10 and 11. Reference characters $L_1$, $L_2$ and $L_3$ designate the main power lines used in supplying power to the field windings 10 and 11 and reference numeral 16 designates the main switch which when closed supplies power to the motor so as to operate the motor in the forward or normal running direction. The switch 16 is controlled by the running solenoid 18 which in turn is under control of a conventional start switch 20. Closing of the start switch 20 causes energization of the solenoid 18 whereby the switch 16 closes and initiates operation of the motor in the forward direction. Energization of the solenoid 18 also causes the holding switch 22 to close and causes the switch 24 located in series with the reversing solenoid 26 to open. When switch 22 closes, the transformer 60 is energized and this causes switch 42 to close, as will be explained more fully hereinafter. The reversing solenoid 26 controls the motor reversing switch 28 in accordance with conventional practice. The control elements described thus far are standard elements now commonly used in starting and stopping motors.

For purposes of illustrating one embodiment of my invention, I have shown in Figure 1 a plug control system which includes a first lead wire 30 which is connected to the neutral of the phase winding 11, as shown, and a second lead wire 31 which is connected to the neutral of the phase winding 10. These lead wires supply ripple voltage to the variable potentiometer 32.

It has been found that stray direct current surges are sometimes superimposed on the alternating current power lines as a result of various special types of equipment which may be connected to the main power lines at some distant location. A condenser 34 is included in the circuit, as shown, for blocking out any such stray direct current surges which may otherwise load up the relay coil 40.

A rectifier 38 has its input terminals connected across a portion of the potentiometer 32 and is adapted to have ripple voltage applied thereto. In order to protect the rectifier 38 against excessive surfaces, a thyrite resistance unit 36 has been connected in the circuit as shown. These thyrite units have the characteristic of offering a high resistance to the flow of current under normal conditions but offering very little resistance to abnormally high voltage surges. The presence of the thyrite unit does not adversely affect the control, since voltages within the range of the desired ripple voltage will not cause any objectionable reduction in the resistance of the thyrite unit.

The variable potentiometer 32 allows one to vary the amount of ripple voltage at which the relay 40 drops out. The desired ripple voltage is applied to the rectifier 38 which supplies rectified current to the control relay solenoid 40 for holding the switch 42 closed at all times during plugging when the speed of the motor exceeds a predetermined speed, such as 200 R. P. M.

In order to plug stop the motor, the stop switch 50 is opened, whereby the flow of current to the running solenoid 18 is interrupted. This interruption of current to the solenoid 18 causes the switches 16 and 22 to open and the switch 24 to close. Closing of the switch 24 immediately energizes the reversing solenoid 26 which closes the reversing switch 28, whereby the field torque is reversed and the motor very promptly reduces its speed. This reduction in speed reduces the effectiveness of the ripple voltage to a predetermined point where the control relay solenoid 40 is no longer supplied with power enough to hold the switch 42 closed.

Since opening of switch 16 may cut off the supply of current to the field windings of the motor before the reversing switch 28 has had time to close, it is desirable to provide some form of time delay means for normally holding switch 42 closed during the time interval between the opening of switch 16 and the closing of switch 28. One form of time delay means which can be used will now be described. Upon closing the start switch 20, current is supplied to the transformer 60 which in turn supplies current to the condenser 66 and the relay coil 62. The charge on the condenser 66 is then available for energizing the solenoid 62 for a period of time sufficient to hold the switch 42 closed until switch 28 closes. After switch 28 closes the coil 40 will be supplied with current for holding the switch 42 closed until the reduction in speed indicates that it is time for the switch 42 to open and thereby deenergize the reversing relay 26 so as to open the switch 28.

The condenser 66 is shorted out by the switch 67 during the plugging operation so as to discharge the condenser, whereby only ripple voltage exercises any control on the switch 42 as the speed of the motor decreases. By virtue of this shortcircuiting of the condenser 66, the accuracy of the control is increased, since only ripple voltage, which is a function of the speed of the motor, has complete control.

Figure 3:
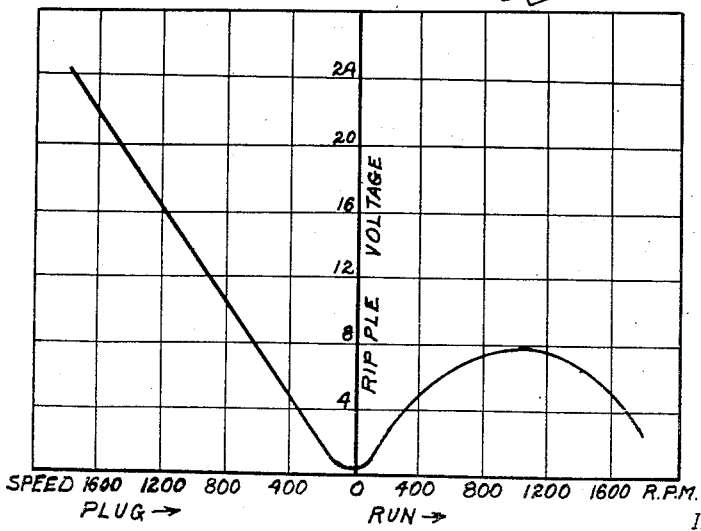
Figure 3 is a graph showing the relationship between the ripple voltage and the motor speed in a typical motor embodying my invention.

A voltage responsive meter 68 constructed like any conventional voltmeter is connected between the lines 30 and 31 and since the ripple voltage only affects the meter and since the ripple voltage is a function of the motor speed, the deflection of the meter needle directly indicates motor speed within given speed ranges, as indicated in Figure 3 of the drawings. The scale 72 of the meter is calibrated in terms of R. P. M. and serves as a simple and accurate means for indicating minor variations in motor speed during normal operation of the motor. By using a frequency meter in place of a voltage type of meter, it could be used to indicate the motor speed at all motor speeds, since the frequency of the ripple voltage is directly proportional to the motor speed at all times.

I have discovered that the amount of ripple voltage available in a given motor design is greatly influenced by the distribution of stator slots and teeth with respect to the rotor bars. In a motor in which the relationship between the stator teeth or slots and the rotor bars is most advantageous, the vectors of the voltage generated in the individual phase windings are additive so that by connecting a voltmeter or any electrical means between the two neutral points of the Y—Y windings, as shown in Figure 1, one obtains a relatively high ripple voltage which is the sum of the ripple voltages generated in the phase windings. When connecting any kind of electrical device between these two neutral points of the Y—Y connected windings, the effect of the main power supply voltage is zero, so that the ripple voltage alone is applied to the device.

Figure 2:
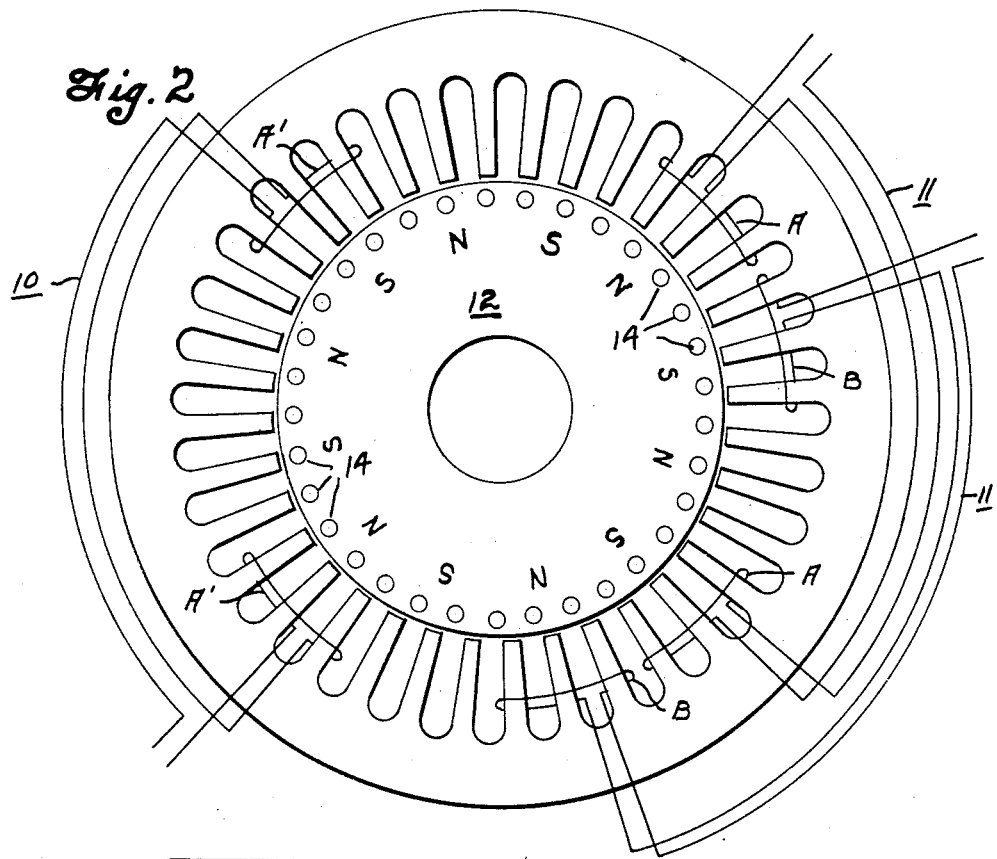
Figure 2 is a schematic view showing the relationship between the rotor bars, the stator teeth and the stator windings in a motor designed to generate a high ripple voltage.

In Figure 2 of the drawings I have somewhat diagrammatically shown the relationship between the bars of the 33 bar rotor to the teeth and slots of a 36 slot stator. Reference characters A and A' have been used to designate respectively the arrangement of the phase windings A and A' of Figure 1. With this arrangement of windings and rotor bars, the vectors of the ripple voltages generated in the windings A and A' are additive. The same is true of the vectors of the ripple voltages generated in the windings B, B', C and C'. In order to simplify the disclosure in Figure 2 of the drawings only, windings A, A' and B have been shown, since the arrangement of the other windings would be obvious to anyone familiar with motor windings.

If a 34 bar rotor were to be substituted for the 33 bar rotor shown in Figure 2, the vector sum of the ripple voltages when measured between the neutral points of the two Y windings would be practically zero. The reason for this is that when using an even number of rotor bars with a stator having 36 coil slots, the relationship between the rotor bars and the stator teeth or slots happen to be such that the vectors of the ripple voltages generated in the individual stator coils are not cumulative but nullify one another. By maintaining a proper relationship between the number of rotor bars to the number of stator slots so that the voltage generated in each coil has the proper vector relationship to the voltage generated in each of the other coils, it is possible to design a motor which supplies an adequate ripple voltage for operating a plugging relay, as shown in Figure 1 of the drawings. Whereas conventional motors having Y—Y connected stator windings have no provision for connecting any control device or the like to the neutral points of the Y connections, motors constructed in accordance with my invention are provided with terminals such as 80 and 82 for making connections to the neutral points of the stator windings, as shown in Figure 1. In ordinary motors the neutral points of the stator windings are usually buried or are inaccessible for all intents and purposes.

For purposes of illustrating my invention, I have shown a system in which the ripple voltage is used for plug control and speed indicating purposes, whereas other types of electrical devices could be connected to the terminals 80 and 82 so as to be operated by the available ripple voltage.

The arrows in Figure 1 illustrate the manner in which the ripple voltage generated in each individual phase winding in a properly designed motor combines with the ripple voltage of each of the other phase windings to provide a suitable source of power which is unaffected by the main power supply.

Whereas the center points of the two sets of Y—Y phase windings to which the connections 80 and 82 are made are extensively known and referred to as neutral points due to the fact that the power line voltage does not itself produce any voltage difference across these points, it is obvious that in the motor design disclosed herein there will be a voltage difference between the so-called neutral points. However, the conventional term "neutral points" has been used to designate these points of the windings shown.

This invention is especially applicable to four pole motors having Y—Y connected windings, but the principle involved could be applied to other types of motors without departing from the spirit of my invention.

As illustrated in Figure 3 of the drawings, the maximum ripple voltage is produced at the beginning of the plug cycle and throughout the major part of the plugging operation there exists a straight line relationship between the ripple voltage generated and the motor speed. If the motor were not brought to a complete stop but were allowed to reverse its direction of rotation and come up to full speed in the reverse direction, the relationship of the ripple voltage to the motor speed would be as shown in Figure 3. As indicated in this figure of the drawing, the voltage across the terminals 80 and 82 is very nearly zero as the speed of the motor passes through the zero point. As the speed of the motor decreases, the frequency of the ripple voltage decreases proportionately and by virtue of applicant's improved circuit arrangement as disclosed herein, the frequency of the main power supply at no time influences the ripple voltage to any appreciable extent, since in the motor design disclosed herein the ripple voltage has been virtually isolated from the main power line voltage.

For a given motor design, the magnitude of the ripple is a function of the product of the rotor speed and current in the rotor bars. The magnitude is therefore greatest when the motor is running at full speed and just after the field has been reversed as at the instant of plug.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In combination, a motor stator having at least two sets of Y—Y connected phase windings, a squirrel cage rotor having an odd number of conductor bars which pass beneath said phase windings so as to generate a ripple voltage in said windings, the ripple voltage generated in one set of windings being substantially out of phase with the ripple voltage generated in another set of windings, said ripple voltage being generated in response to relative rotation between said conductor bars and said phase windings, leads accessible externally of the motor for making connections to the neutral points of said Y—Y windings, and a ripple voltage responsive device connected to said leads so as to utilize the ripple voltage across said neutral points for operating said ripple voltage responsive device.

2. In a four pole motor, a motor stator having at least two sets of Y—Y connected phase windings arranged in slots provided in said stator, a squirrel cage rotor having an odd number of rotor bars arranged to pass beneath said phase windings so as to generate a ripple voltage in said windings in response to relative rotation between said rotor bars and said phase windings, and means responsive to changes in said ripple voltage and connected between the neutral points of said Y—Y windings so as to be operated by the ripple voltage present between said neutral points.

3. In a four pole motor, a motor stator having Y—Y connected phase windings arranged in slots provided in said stator, a squirrel cage rotor having an odd number of rotor bars arranged to pass beneath said phase windings so as to generate a ripple voltage in said windings in response to relative rotation between said rotor bars and said phase windings, and means connected between the neutral points of said Y—Y windings so as to be operated by the ripple voltage present between said neutral points, said last named means comprising a plug controller for said motor.

4. In a four pole motor, a motor stator having Y—Y connected phase windings arranged in slots provided in said stator, a squirrel cage rotor having an odd number of rotor bars arranged to pass beneath said phase windings so as to generate a ripple voltage in said windings in response to relative rotation between said rotor bars and said phase windings, and means connected between the neutral points of said Y—Y windings so as to be operated by the ripple voltage present between said neutral points, said last named means comprising a voltmeter calibrated in terms of motor speed.

SAMUEL NOODLEMAN.

References Cited in the file of this patent

UNITED STATES PATENTS

| Number | Name | Date |
| --- | --- | --- |
| 734,294 | Berg | July 21, 1903 |
| 1,244,983 | Hunt | Oct. 30, 1917 |
| 1,992,050 | Alger | Feb. 25, 1930 |
| 2,160,594 | Krels | May 30, 1939 |
| 2,162,513 | McShane | June 13, 1939 |
| 2,178,290 | Sorensen | Oct. 31, 1939 |
| 2,246,516 | Herzog | June 24, 1941 |
| 2,322,114 | Clare et al. | June 15, 1943 |